UNITED STATES PATENT OFFICE.

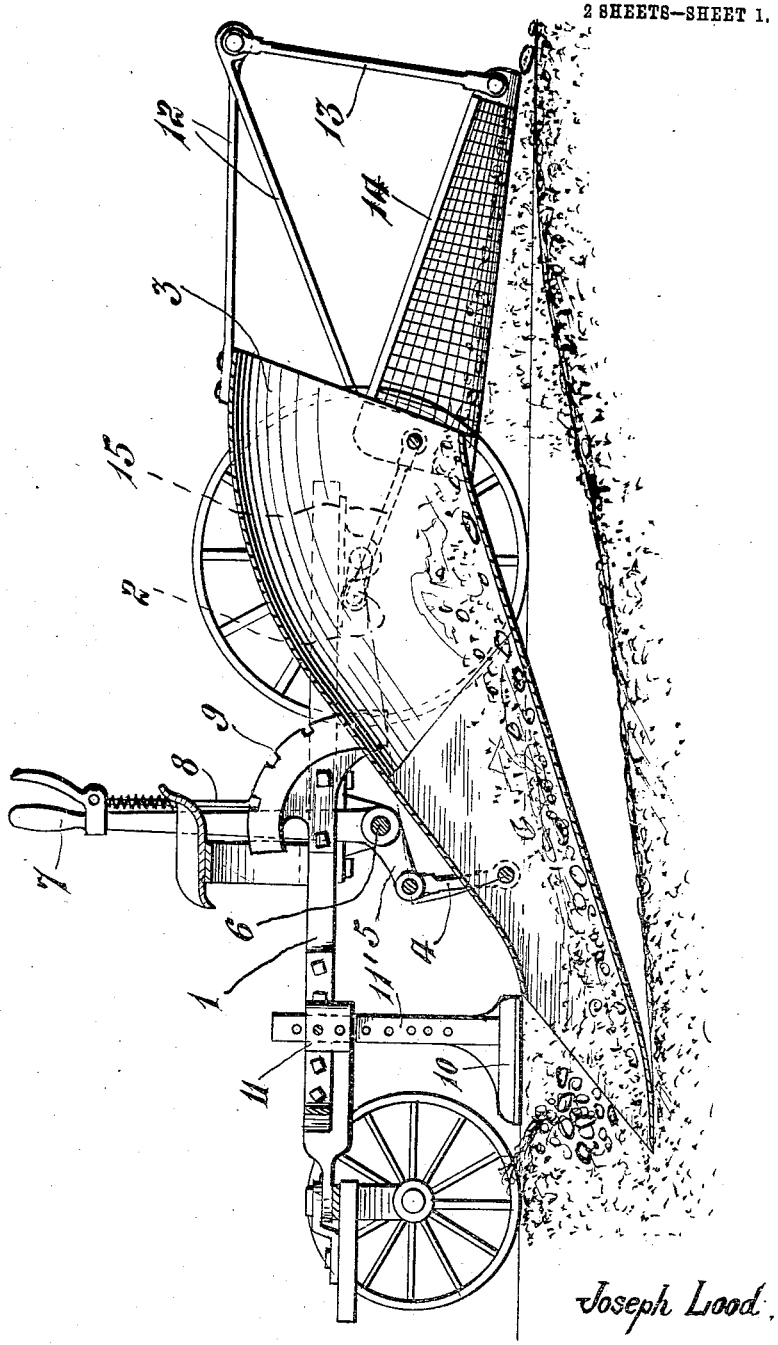

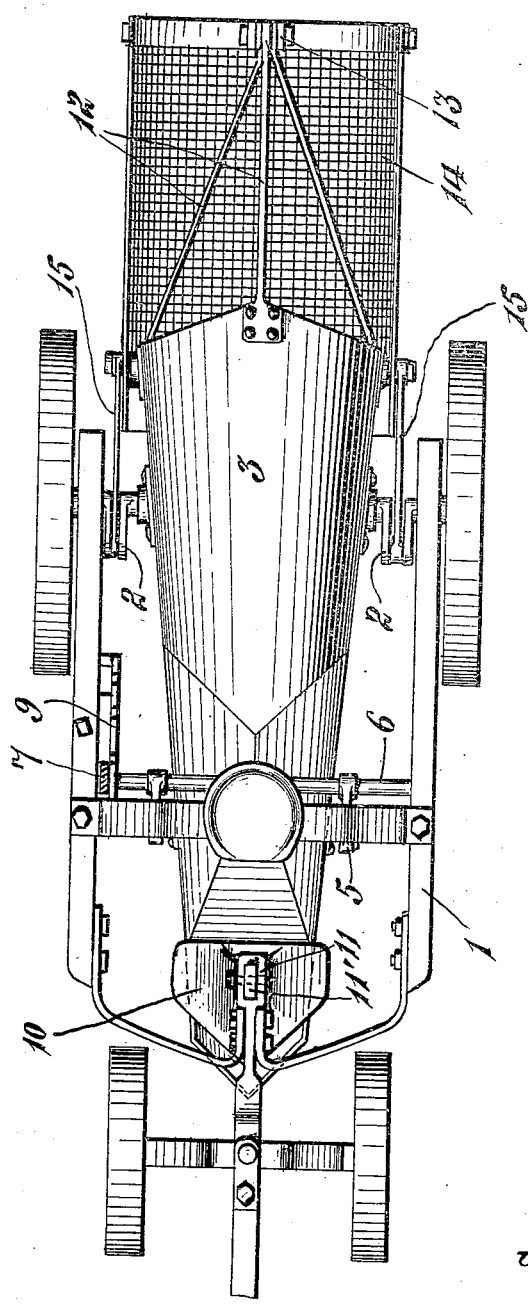

JOSEPH LOOD, OF MONTREAL, QUEBEC, CANADA.

POTATO-HARVESTER.

936,333.  Specification of Letters Patent.  Patented Oct. 12, 1909.

Application filed December 19, 1908. Serial No. 468,316.

*To all whom it may concern:*

Be it known that I, JOSEPH LOOD, a subject of the King of Great Britain, residing in the city and District of Montreal, in the Province of Quebec, Canada, have invented certain new and useful Improvements in Potato-Harvesters; and I do hereby declare that the following is a full, clear, and exact description of the invention, such as will enable others skilled in the art to which it appertains to make and use the same.

The invention to be hereinafter described relates to harvesting machines, and more particularly to the general class of such machines as are commonly known as potato diggers.

Broadly speaking, it comprises a framework, a tubular scoop pivotally suspended therefrom and provided with a forwardly projecting digging end, means for raising and lowering the scoop end, an adjustable presser foot mounted in advance of the scoop end, a screen or sifter pivotally suspended from the rear of the scoop, and means for operating said screen.

In order to more clearly disclose the construction, operation and use of the invention, reference should be had to the accompanying drawings forming part of the present application.

In the drawings: Figure 1 is a vertical longitudinal sectional view of the machine; and, Fig. 2 is a plan view of the machine.

A suitable frame 1 of any desired form and construction may be used. In this frame are journaled the stub axles of the rear supporting wheels. Each of these stub axles is provided with a crank arm 2, for a purpose to be later disclosed, and has its inner end journaled in a box secured to the outer face of a long tapered inclined tubular scoop 3. In this way, the stub axles 2 form pivotal supports for the rear end of the scoop. The forward end of the scoop is suspended from links 4, connected to the arms 5 of a rock shaft 6. To this rock shaft 6 is fixed a hand lever 7, by which it may be operated. Thus, when it is desired to raise the digging end of the scoop, it is only necessary to swing the lever 7 rearwardly and allow the spring catch 8 to drop into a notch of the arc plate 9.

In order to prevent earth and potatoes passing above the upper edge of the scoop, a presser foot 10 is adjustably mounted just in advance of the scoop end. Its adjustment is effected by a pin adapted to pass through perforations in the guide sleeve 11 and like perforations in the upright 11' of the presser foot. This presser foot acts, of course, to level off the earth in advance of the scoop end.

From the rear of the scoop extend braces 12, from which is pivotally suspended a long link 13, the lower end of which is pivotally connected to a screen or sifter 14, the upper end of which lies beneath the rear edge of the scoop. The sides of the upper end of this screen are connected by links 15 to the cranks 2. Consequently, the forward movement of the machine and resulting revolution of the cranks 2 effect a swinging movement of the sifter screen.

The operation of the machine is as follows: The lever 7 is swung forward to allow the digging end of the tubular scoop to enter the soil at the desired depth, the scoop being locked in this position by the latch 8 engaging a notch in the arc plate 9. Next, the presser foot 10 is adjusted so that its lower face is just on a line with the upper edge of the scoop mouth. The machine is now moved forward, and the earth and potatoes dug by the projecting pointed end of the scoop are forced up the incline, through the tube and out onto the screen. This screen, due to the manner of its suspension and its connection with the cranks 2, receives rapid reciprocating forward and backward motion, as well as simultaneous raising and lowering movement. This combined motion acts to thoroughly separate the loose soil from the potatoes, delivering the free potatoes out of the rear end of the screen and the loose earth through the screen beneath.

It is clear that changes may be made in the construction, arrangement and disposition of the several parts of the invention, without in any way departing from the field and scope of the same, and it is meant to include all such within this application, wherein only a preferred form has been disclosed.

Having thus fully described my invention, what I claim as new, and desire to secure by Letters Patent, is:—

1. A potato digger comprising a frame, a tubular scoop adjustably suspended from said frame, means for adjusting said scoop, a presser foot adjustably mounted in advance of said scoop, and an automatically operated screen pivotally suspended in the rear of and below said scoop.

2. A potato digger comprising a frame, a tubular scoop adjustably and pivotally suspended from said frame, means for adjusting said scoop, means for locking said scoop in adjusted position, a presser foot adjustably mounted in advance of said tubular scoop, an automatic sifting device pivotally suspended in the rear of and below said scoop, and means for operating said sifting device.

3. A potato digger comprising a frame, a tubular scoop adjustably and pivotally suspended from said frame, means for adjusting said scoop, means for locking said scoop in adjusted position, a presser foot adjustably mounted in advance of said scoop, a sifting device pivotally suspended from the rear of and below said scoop, and crank mechanism for operating said scoop.

4. A potato digger comprising a frame, a tubular scoop adjustably suspended from said frame, means for adjusting said scoop, means for locking said scoop in adjusted position, a presser foot adjustably mounted in advance of said scoop, an automatic sifter mounted in the rear of and below said scoop, and means for imparting a raising and lowering and a longitudinally reciprocating motion to said sifter.

In witness whereof I have hereunto set my hand in the presence of two witnesses.

JOSEPH LOOD.

Witnesses:
L. A. GAUVIN,
W. S. BABCOCK.